US008582460B2

(12) United States Patent
Croot et al.

(10) Patent No.: US 8,582,460 B2
(45) Date of Patent: Nov. 12, 2013

(54) DATA COMMUNICATIONS

(75) Inventors: Christopher M Croot, Suffolk (GB); Trevor P Linney, Suffolk (GB); Philip A Everett, Suffolk (GB); John W Cook, Suffolk (GB); Ashley Pickering, Suffolk (GB)

(73) Assignee: British Telecommunications PLC, London (GB)

( * ) Notice: Subject to any disclaimer, the term of this patent is extended or adjusted under 35 U.S.C. 154(b) by 314 days.

(21) Appl. No.: 12/922,242

(22) PCT Filed: Mar. 30, 2009

(86) PCT No.: PCT/GB2009/000836
§ 371 (c)(1),
(2), (4) Date: Sep. 13, 2010

(87) PCT Pub. No.: WO2009/122154
PCT Pub. Date: Oct. 8, 2009

(65) Prior Publication Data
US 2011/0019575 A1   Jan. 27, 2011

(30) Foreign Application Priority Data
Mar. 31, 2008  (EP) .................................... 082512633

(51) Int. Cl.
*H04L 1/00*        (2006.01)
(52) U.S. Cl.
USPC .......................... 370/252; 709/223; 709/224
(58) Field of Classification Search
USPC .................. 370/229–240; 709/223–224
See application file for complete search history.

(56) References Cited

U.S. PATENT DOCUMENTS 6,128,348 A * 10/2000 Kao et al. ........................ 375/260
6,732,281 B1 * 5/2004 Mantri et al. .................. 713/300
(Continued)

FOREIGN PATENT DOCUMENTS

EP    1 328 081         7/2003
WO    02/093784         11/2002
WO    2007/044255       4/2007

OTHER PUBLICATIONS

International Search Report and Written Opinion of the International Searching Authority (7 pgs.) mailed Jun. 18, 2009 issued in International Application No. PCT/GB2009/000836.

(Continued)

*Primary Examiner* — Charles C Jiang
(74) *Attorney, Agent, or Firm* — Nixon & Vanderhye PC

(57) ABSTRACT

In a method and system for operating an ADSL access network which has a plurality of data connections (19) between the access network and end user devices (10), and in which the access network controls the rate at which data is transferred between the user devices and an onward connection (50), the access network stores a plurality of capped profiles each of which specifies a respective upper data rate to which the connection is limited and which is below the maximum achievable rate for the connection. The access network operates using a Dynamic Line Management (DLM) algorithm which, for a given data connection, operates to enable data transfer at a variable data rate up to the maximum rate, monitors the error performance and signal to noise margin variation for different data rates and, in the event that one or both are outside respective limits for a predetermined period, selects and applies one of the capped profiles to limit the upper data rate, selection being determined by the highest data rate achieved for which the error performance was within acceptable limits.

15 Claims, 4 Drawing Sheets

(56) References Cited

U.S. PATENT DOCUMENTS

| | | | |
|---|---|---|---|
| 2001/0048667 A1* | 12/2001 | Hamdi | 370/252 |
| 2005/0123028 A1 | 6/2005 | Cioffi et al. | |
| 2005/0128954 A1 | 6/2005 | Li et al. | |
| 2006/0198430 A1 | 9/2006 | Rhee et al. | |
| 2007/0002758 A1 | 1/2007 | Blackburn et al. | |
| 2007/0036339 A1 | 2/2007 | Cioffi et al. | |
| 2007/0086353 A1 | 4/2007 | Gefflaut et al. | |
| 2008/0031313 A1* | 2/2008 | Oksman | 375/222 |

OTHER PUBLICATIONS

Extended European Search Report (7 pgs.) dated Sep. 3, 2008 issued in European Application No. 08251263.3.

Alcatel Technology White Paper "Dynamic Line Management for Digital Subscriber Lines: Maximizing Data Rates Maintaining Quality and Stability"; XP-002442256; 9 pgs.

International Search Report for PCT/GB2009/000836, mailed Jun. 18, 2009.

* cited by examiner

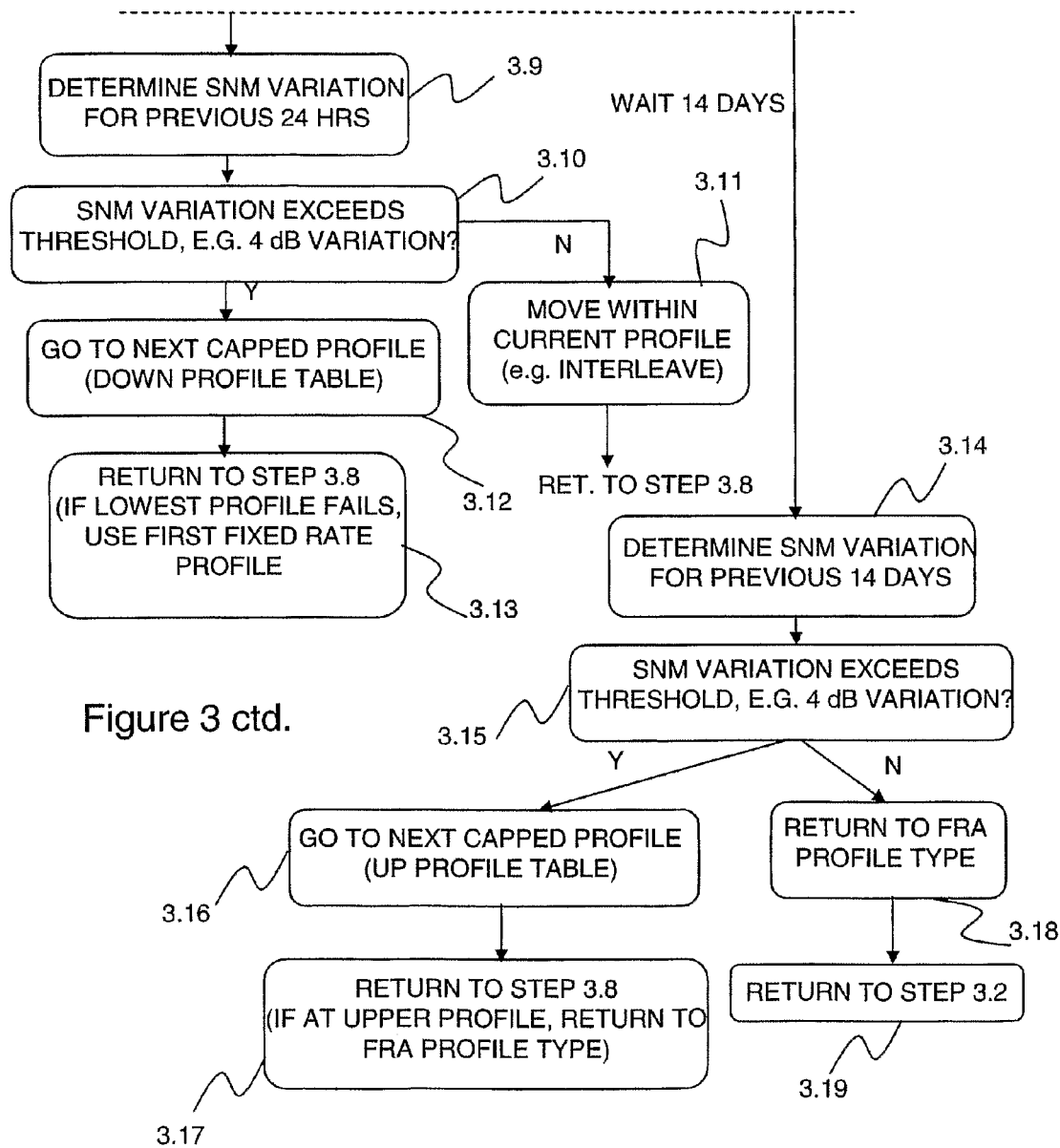
Figure 3 ctd.

DATA COMMUNICATIONS

This application is the U.S. national phase of International Application No. PCT/GB2009/000836 filed 30 Mar. 2009, which designated the U.S. and claims priority to GB Application No. 08251263.3 filed 31 Mar. 2008, the entire contents of each of which are hereby incorporated by reference.

FIELD OF THE INVENTION

The present invention relates to data communications, and particularly, though not exclusively, to the management of an access network including Digital Subscriber Line (DSL) connections.

BACKGROUND TO THE INVENTION

A relatively recent development in the operation of access networks employing DSL connections is to move from fixed rate connections (where a user contractually agrees with the network operator/service provider a fixed rate (e.g. 2 Mbit/s) at which the DSL connection will operate and the network always attempts to set up a connection at exactly this speed) to rate adaptive connections where the DSL connection attempts to connect up at the fastest achievable (but reasonably stable) speed of connection (e.g. up to 8 Mbit/s).

Dynamic Line Management (DLM) is a technique for improving the stability of DSL connections. It is particularly useful when operating DSL connections at close to their maximum speed as occurs in rate adaptive connections because, under these conditions, external noise affecting the transmitted signal can cause the transceivers to be unable to successfully recover the signal to be transmitted with sufficient reliability to enable the connection to be maintained. If this occurs, the connection needs to be re-established. This operation is referred to as a re-synchronisation or a re-train and, during this operation, the end user will notice a loss of service. Re-synchronisations are particularly annoying to end users and it highly desirable to minimise their occurrence.

DLM seeks to minimise the rate of occurrence of re-synchronisations by automatically analysing DSL connections and varying certain parameters which can affect the likelihood of them re-occurring, for example by reducing the data rate or increasing the interleaving depth. Typically this is done by providing a number of different profiles each having various different sets of values for the parameters most likely to have an impact on the stability or otherwise of a DSL connection, and moving a particular connection between different profiles until a profile is found which has acceptable stability. For example, the profiles may specify a minimum and maximum data rate, a target (i.e. minimum) signal to noise margin (SNM) and a level of interleave (all of these parameters are discussed in greater detail below). In a typical rate adaptive profile, the minimum rate is set at some predetermined minimum acceptable speed (e.g. 512 Kbit/s) below which the line is no longer considered to be operating at a broadband speed connection and the maximum is set to the maximum rate which the equipment can support under ideal circumstances (i.e. where there is a very high signal to noise ratio for the received signals). The profiles are applied at the Digital Subscriber Line Access Multiplexer (DSLAM), which is usually housed at a local exchange, sometimes referred to as a central office in the United States, and which contains a number of DSL transceiver units as is well known in the art. In applying a given rate adaptive profile, the DSLAM will attempt to negotiate the greatest rate it can manage whilst still achieving the target SNM specified in the respective profile being applied to the connection—the aim is to find a profile such that the connection operates at the highest rate of data transfer that it can sustain without the line ever being forced into performing a resynchronisation—note that once a connection has synchronised it may respond to changes in the external noise affecting the line by performing "bit-swapping" (this involves changing the number of bits transmitted by each channel—i.e. if one channel finds that its measured signal to noise ratio has improved whilst another's has worsened, the former can start transmitting more bits while the latter transmits a correspondingly reduced amount) but it will keep the overall data transfer rate constant. In order to apply the profile the DSL transceivers measure the signal to noise ratio experienced during the synchronisation period on each channel and then determine how many bits (per symbol or per second etc.) can be transmitted in each channel based on this measurement.

The system would be fairly straightforward if the noise level was fairly constant as then the SNR measured at synchronisation would be representative of the SNR going forward. However, since the noise may comprise components of crosstalk, impulse noise and Repetitive Electrical Impulse Noise (REIN), all of which can vary with time the SNR measured at synchronisation may well not accurately reflect the SNR going forward in time. An incorrect noise estimation may result, in one direction (i.e. if the overall level of noise over all channels increases from the time that the synchronisation was performed by more than the amount catered for by the SNR target margin), in the DSLAM employing a rate which still results in instability or, in the other direction (i.e. if the overall noise reduces or does not ever increase as much as the SNR target margin catered for), one which is too conservative and so results in a poor data rate.

If the noise varies over relatively short periods, it is particularly difficult to estimate the noise and so SNR. Although the DSLAM may estimate the noise over a period which is adequate to observe such short term variation, the statistics of the noise in terms of peak to mean ratio and other measures can make it difficult to correctly compute the maximum available data rate that can be achieved. If the noise varies over longer time scales, it may be that the estimate used when the DSLAM established a connection, although correct at the time, is incorrect a short time later causing the connection to fail and require re-synchronisation. This can happen repeatedly. It may even be that the DSLAM transceiver is itself poorly implemented and so incorrectly estimates the noise.

In view of this, it is desirable to provide an improved DLM algorithm.

SUMMARY OF THE INVENTION

According to a first aspect of the present invention, there is provided a method of operating an access network including a plurality of data connections between end user devices and an aggregation transceiver device where the connections are aggregated for onward connection through the access network, the method comprising:

storing a plurality of different profiles including one or more fully rate adaptive profiles and one or more rate capped profiles, each of which specifies a set of values for a plurality of parameters associated with each data connection; and, for each data connection, monitoring the performance of the connection;

selecting one of said stored profiles to be applied to the connection in dependence on the results of monitoring the connection; and applying the selected profile to the data connection;

wherein monitoring the connection includes measuring the variation in Signal to Noise ratio of received signals over a predetermined period of time and selecting a rate capped profile in the event that the variation exceeds a predetermined amount of variation.

Preferably the predetermined period of time is at least greater than one hour and most preferably it is of the order of a day or a week. Preferably the predetermined amount of variation which, if exceeded, causes a rate capped profile to be applied to a connection is at least 3 dB. By fully rate adaptive profile, it is meant a profile for which the maximum rate specified is the maximum rate which the aggregation transceiver device (or the combination of the aggregation transceiver device and the end user device—such as a DSL modem) can support. This is often based on the nature of the protocol being employed for the connection—e.g. many DSLAM's operating using ADSL 1 have a maximum rate which they can support even in ideal noise conditions of 8128 Kbits because of the type of framing which they employ, whilst DSLAM's operating in ADSL 2+ mode have a maximum rate of 24 Mbit/s, etc. By rate capped profile, it is meant a profile which sets an upper limit connection rate which is significantly less than the maximum rate supported by the equipment under ideal circumstances. By specifying an upper limit rate which is less than the maximum rate theoretically supportable by the equipment, it ensures that even if a very low level of noise (i.e. a very high level of SNR) is measured by the equipment at the time of synchronising the connection, it will still not connect as at high a rate as it would if it were running under a fully rate adaptive profile for a given target SNR margin. This protects against lines which, even if they were on a profile with a very high SNR margin target might still connect up at too high a speed if they happened to synchronise at a time when the line was experiencing very low levels of noise, from connecting up at too high a rate and then later experiencing much higher levels of noise resulting a loss of connection. Additionally it would benefit such lines by enabling them to use a lower SNR margin target than would otherwise be possible, which would enable the lines to connect at a higher rate than they otherwise would (if they had a higher SNR margin target) if they happened to synchronise at a time when they were experiencing very high levels of noise (i.e. at the peak of the medium term variation in noise experienced by the line—where medium term indicates a period of a day or a week or so).

In order to prevent having to monitor all DSL connections in the access network, it may be desirable to only monitor those connections which are behaving unstably. Thus connections which are generally operating well on a fully rate adaptive profile will not need to be monitored for SNM variability and data about their observed variability of SNM need not be taken or processed etc. However, it is preferable to monitor this variability for lines which are behaving unstably in order to ascertain if they should just move to a fully rate adaptive profile with a higher level of interleave and/or target SNM or rather move to a rate capped profile as well as for lines which have already been placed onto a rate capped profile to ensure that they continue to stay on a rate capped profile if it is appropriate for those lines to remain on a rate capped profile (e.g. because of medium term variability of observed SNM).

According to a second aspect of the invention, there is provided a method of operating an access network including a plurality of data connections between the access network and end user devices, wherein the access network controls the rate at which data is transferred between the user devices and an onward connection, wherein the method comprises, for a given data connection: (a) enabling data transfer at a variable data rate up to a maximum rate; (b) determining connection performance for the variable data rate based on errors detected for different data rates; (c) measuring the variation in signal to noise margin and, in the event that the variation exceeds a predetermined level, limiting the upper rate at which the connection can operate to one below the maximum rate, said upper rate being selected in accordance with a data rate at which the connection was operated in (a) with a connection performance determined to be within acceptable limits.

As mentioned previously, the aim of a DLM algorithm is to maximise a connection's data rate whilst maintaining stability. Here, we use the variability of the signal to noise margin (SNM) as an indicator that a rate increase should or should not be made for a connection. Particularly, the variability of the signal to noise ratio margin (SNM) on the connection is measured over a predetermined period, preferably a medium term period not shorter than twelve hours and more likely to be in the order of twenty four hours, and, if the variability of the SNM is greater than a predetermined threshold, the upper rate of the line is capped to one below the maximum.

Step (c) may be performed in response to step (b) determining the connection performance to be outside acceptable limits. In other words, first a determination is made as to the stability of the line in terms of its connection performance, herein referred to as its Indicative Line Quality (ILQ), and, if this indicates instability, the variability measure is used to determine what further options are taken. The connection performance may be based at least partially on the average error rate which occurs for the given data rate over a predetermined period, as well as the number of resynchronisations experienced by the connection over a predetermined period (preferably however, some mechanism is used to attempt to distinguish between forced resynchronisations caused by the line losing the connection because of excessive noise conditions and user caused resynchronisations where a user has simply switched off his/her modem or disconnected it etc.). In terms of profiles, this equates to initially applying fully rate adaptive profiles to a connection and then monitoring the line to establish if it is behaving unstably (i.e. by detecting forced re-synchronisations caused by a loss of connection) even after changing to a reasonably conservative profile (e.g. one with a target SNR margin (SNM) of 6 or 9 dB). In such a case, if medium term variability of the SNR is detected (i.e. by detecting a change in the SNM), then the connection can be moved to having a rate capped profile applied. Once a rate capped profile has been applied, it is advantageous if the connection continues to be monitored for excessive medium term variability in the observed SNM. If this observed SNM variability is greater than a predetermined amount over a medium term period, then it is preferred to keep the line on a rate capped profile even if it has been behaving stably for some period of time on the rate capped profile (though it may be beneficial in such circumstances to consider moving the line to a new rate capped profile with a lower target SNM and/or a higher upper rate limit).

The upper rate may be selected in accordance with a threshold rate comprising the highest data rate at which the connection was operated in step (a) during a trial period with a connection performance (i.e. a stability of the connection in terms of number of errors, re-synchronisations, etc.) determined to be within acceptable limits for a predetermined period, preferably over the entire trial period. Since an algorithm according to an embodiment of the present invention in some circumstances operates to maximise the data rate by reducing the rate during the trial period until the line is stable, the threshold rate is sometimes referred to as the minimum line rate since this is, in practice, the lowest rate that the line operates at over the predetermined trial period; the line rate will not drop any further once stability is achieved. The predetermined trial period may be a medium term period not less than twelve hours. In the embodiment described herein, the connection performance is assessed daily on the basis of the previous twenty four hours. The upper rate is preferably selected to be below said minimum line rate, i.e. the highest rate at which the connection was operated in step (a) with stability over the predetermined period.

The upper rate may be selected from a plurality of predefined profiles each of which specifies a different upper rate to be applied to the connection, the selected profile being the one having the closest upper rate to said highest rate at which the connection was operated with stability in step (a). If the connection performance with the selected profile is also outside acceptable stability limits for a predetermined period, the next profile having a lower upper rate is applied. The different profile may be selected and applied only if, in addition to the connection profile being outside acceptable stability limits, the variation in signal to noise margin is above the predetermined level. If the connection performance with the selected profile is within acceptable limits for a predetermined period, the upper data rate at which the connection can operate may be increased, the increased upper data rate being dependent on whether the variation in signal to noise margin exceeds the predetermined level. If the variation in signal to noise margin exceeds the predetermined level, a different one of the rate capped profiles having the next highest upper rate may be applied. If the variation in signal to noise margin does not exceed a predetermined level, the upper data rate may be the maximum data rate for the connection (i.e. a fully rate adaptive profile may be applied to the connection).

According to a third aspect of the invention, there is provided a method of operating an access network including a plurality of data connections between an aggregation device in the access network and end user devices, wherein the aggregation device controls the rate at which data is transferred between the user devices and an onward connection, wherein the method comprises, for a given data connection: (a) enabling data transfer at a variable data rate between predetermined upper and lower limits; and (b) determining whether at least the predetermined upper limit can be changed after a predetermined period in dependence on whether the variation in signal to noise ratio margin exceeds a predetermined threshold during said period.

According to a fourth aspect of the invention, there is provided a method of operating an access network including a plurality of data connections between the access network and end user devices, wherein the access network controls the rate at which data is transferred between the user devices and an onward connection, the access network storing a plurality of capped profiles each of which specifies a respective upper data rate to which the connection can be limited, each upper data rate being below the maximum achievable rate for the connection, wherein the method comprises, for a given data connection: enabling data transfer at a variable data rate up to the maximum rate; monitoring the error performance and signal to noise margin variation for different data rates and, in the event that both are outside respective limits for a predetermined period, selecting and applying one of the capped profiles to limit the upper data rate, selection being determined by the highest data rate achieved for which the error performance was within acceptable limits.

According to a fifth aspect of the invention, there is provided a management device for use in an access network including a plurality of data connections between the access network and end user devices, wherein the access network is arranged to control the rate at which data is transferred between the user devices and an onward connection, the management device comprising: means arranged to transfer data at a variable data rate up to a maximum rate; means arranged to determine connection performance for different data rates based at least partially on errors which occur for the different data rates; and means arranged to measure the variation in signal to noise margin and, in the event that the variation exceeds a predetermined level, to limit the upper rate at which the connection can operate to one below the maximum rate, said upper rate being selected in dependence on the or each data rate at which the connection was operated previously with a connection performance determined to be within acceptable limits.

According to a sixth aspect of the invention, there is provided carrier means carrying a computer program or suite of computer programs for causing the method defined above to be carried out during execution of the program or programs.

BRIEF DESCRIPTION OF THE DRAWINGS

The invention will now be described, by way of example, with reference to the accompanying drawings in which.

DESCRIPTION OF A PREFERRED EMBODIMENT

Figure 1:
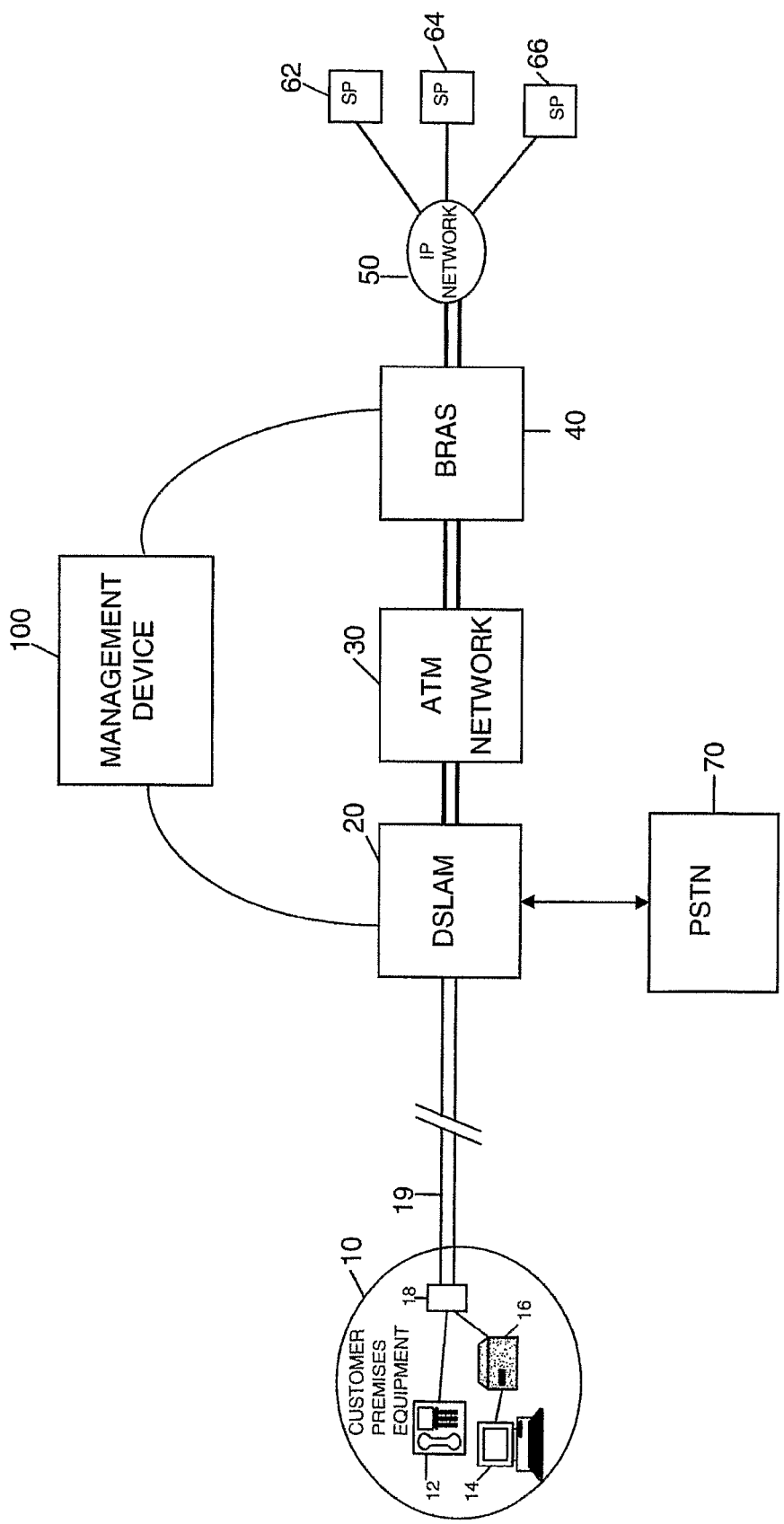
FIG. 1 is a schematic block diagram illustrating a telecommunications network incorporating a management device for performing a Dynamic Line Management (DLM) algorithm.

Referring to FIG. 1, the embodiment described below uses a management device 100 to perform two principal functions, namely Broadband Access Remote Server (BRAS) provisioning and Dynamic Line Management (DLM). BRAS provisioning is described very briefly in this application, for the sake of completeness, but is described in greater detail in co-pending International patent applications GB2006/002826 and GB2006/002818. Regarding the DLM function 110, this is used in the embodiment to control the downstream speed, i.e. data rate, of the ADSL connections controlled by the management device 100 to achieve stability and so minimise the need for re-synchronisations caused by noise on the connection.

In overview, the role of the DLM function 110 of the management device 100 is to ensure that the ADSL connections are as stable as possible, i.e. with as few errors and, in particular, as few re-synchronisations as possible whilst still providing a good connection for the end user in terms of bit-rate and latency. The DLM function 110 does this by receiving data from data collectors connected to a DSLAM 20 on a medium term basis, for example on a daily basis, and processing the received data to select one of a number of different profiles which are arranged into different profile types, as will be explained below. Each profile within the different profile types has a different combination of rate range, interleave index and target SNM parameters.

Still referring to FIG. 1, it will be seen that a typical DSL network arrangement includes a copper pair loop 19 which connects customer premises equipment 10 to the DSLAM 20 located within a local exchange. The DSLAM 20 separates voice traffic and data traffic and sends the voice traffic to the Public Switched Telephone Network (PSTN) 70. The data traffic is passed on through an Access Network 30 (which will typically be an ATM network as is assumed in this embodiment) to a BRAS 40 at which several IP traffic streams from (and to) multiple service providers (SPs) 62, 64, 66 are aggregated (and disaggregated) via an IP network 50 which may, of course, itself be provided on top of an ATM network. Within the customer premises equipment 10 there is an ADSL splitter filter 18 for separating the voice and data traffic, a telephone 12 for handling the voice traffic and an ADSL modem 16 for handling the data traffic to and from a computer 14.

The above-mentioned arrangement of items 10, 19, 20, 30, 40, 50, 62, 64, 66 and 70 is conventional. However, in addition to this conventional arrangement, in the present embodiment there is a management device 100 which communicates with both the DSLAM 20 and the BRAS 40. The detailed operation of this device, at least as regards its DLM function, is explained in greater detail below with reference to FIGS. 2 and 3. However, in overview, the management device 100 obtains, using data collectors in the DSLAM 20, information about the rate at which each DSL connects to the DSLAM and information about errors and/or re-synchronisations occurring on each line. In particular, information is calculated in terms of the Mean Time Between Errors (MTBE) and the Mean Time Between Re-Synchronisations (MTBR). These can be defined as:

MTBR=Uptime of Connection/Total Retrains

MTBE=Uptime of Connection/Total Errors (or Code Violations).

Figure 2:
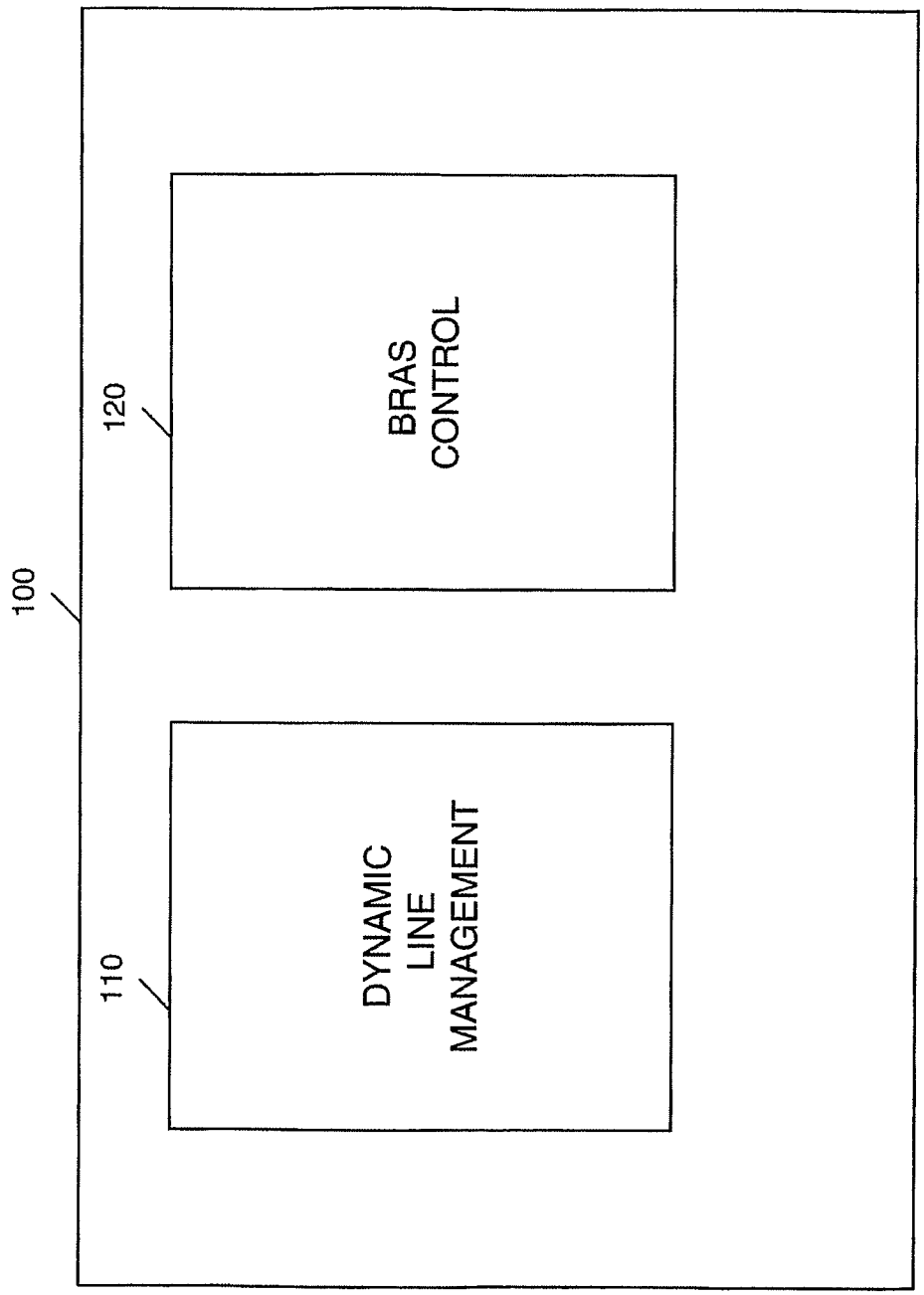
FIG. 2 is a schematic block diagram illustrating the management device of FIG. 1 in more detail.

As shown in FIG. 2, the management device 100 comprises two main functional parts, namely a BRAS control function 120 and a DLM function 110. The latter implements a DLM algorithm.

The BRAS provisioning function 120 processes part of the information received from the DSLAMs to assess a consistent connection speed achieved by each DSL. If it determines that this consistent rate has increased as a result of recent higher rate connections, it instructs the BRAS 40 to allow higher through-flows of traffic for that DSL. On the other hand, if it detects that a particular connection speed is below the stored consistent vale, it reduces the consistent value to the current connection rate and immediately informs the BRAS 40 of the new consistent value rate so that the BRAS does not allow more traffic to flow to the DSL than the DSL is currently able to cope with. Further details of how the BRAS control function 120 may be used are described in co-pending International patent applications GB2006/002826 and GB2006/002818.

Details of the DLM algorithm employed in the present embodiment by the DLM function 110 will now be described. In overview, the DLM function 110 stores a plurality of profiles each of which uses a different combination of parameters, particularly line speed range, interleaving depth (interleaving spreads out the data bits to enable data recovery in the presence of errors) and target SNM (defined in dB). The algorithm operates by periodically changing the selected profile, where required, in order to maximise the line speed that the particular DSL can achieve whilst preferably not going below the target SNM which will likely require a re-synchronisation. Dropping the line speed or increasing interleaving depth will improve the SNM but obviously at the expense of speed and so it is also an aim not to have an excessive SNM margin. Typically, a margin increase of 3 dB will cause a drop of 800 kbits/sec.

The DLM function 110 receives a new file daily from each element manager of the DSLAM 20, the file containing aggregated performance data for up to 96 timeslots per DSL per day. This data is stored as historical performance data and is used in the DLM algorithm to determine if a DSLAM profile currently being employed requires changing to stabilise the end user's service. This means that a change in DSLAM profile will be applied no more frequently than once every twenty four hours which is advantageous in that it avoids the possibility of the DSLAM 20 being reconfigured every time a line re-synchronises. If changes are required, the DLM function sends a request to the Operational Support System (OSS) of the access network for the profile to be changed. The precise way in which this is performed will depend on the details of the OSS of the particular access network and is not relevant to the present invention.

Three different profile types are stored by the management device 100. These types are (i) fully rate adaptive (FRA) profiles, (ii) capped profiles and (iii) fixed rate profiles. The DLM algorithm employed by the DLM function 110 acts to switch not only between profiles but, in the presence of certain conditions described below, between profile types in order to improve the quality of service provided to the end user.

FRA profiles are known and enable a DSL to operate variably between minimum and maximum rates for that DSL. This will depend on the service to which the user subscribes, for example an 8 Mbits/sec (e.g. ADSL1) or 24 Mbits/sec service (e.g. ADSL 2+). Whichever service is used, FRA profiles provide the largest range of variability. Each FRA profile defines its rate range, interleave index (defining whether interleaving is on or off, and possibly, if on, what depth of interleaving—1, 2, 3, etc.) and target SNM. In this embodiment, twenty different FRA profiles are employed as indicated below in table 1. Note that each rate range can be interleaved (with an interleave depth of 1) or not and, for each of these alternatives, five different target SNMs can be used, hence ten profiles for each rate range and so twenty overall.

TABLE 1

| Fully Rate Adaptive Profiles | | |
|---|---|---|
| Rate Range (kbits/sec) | Interleave Index | Target SNM |
| 160-24384 | 0 (Fast) or 1 (Interleaved) | 3 or 6 or 9 or 12 or 15 dB |
| 160-8128 | 0 (Fast) or 1 (Interleaved) | 3 or 6 or 9 or 12 or 15 dB |

The basic flow of a conventional DLM algorithm for a particular line speed, e.g. 160-24384 kbits/sec) using FRA profiles is shown in Table 2.

TABLE 2

Conventional DLM Algorithm

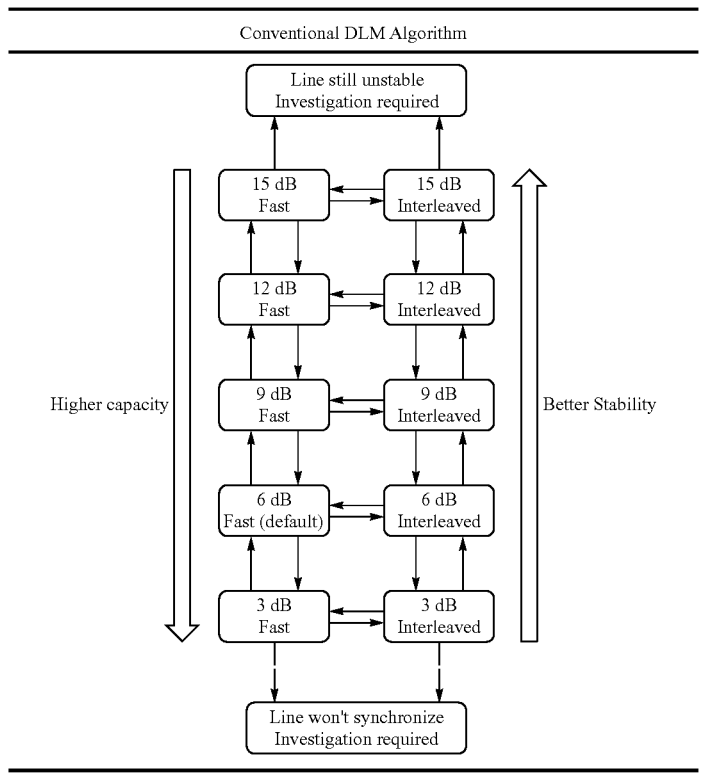

The general progression through the FRA profiles shown in Table 2 is as follows: if a line is to be changed to a more stable profile, the first change is to move to the profile with the same target margin but in interleaved mode instead of fast mode, if the line is already in an interleaved mode, then the line is moved to the next higher target margin profile also in interleaved mode. If the line is to be moved in the direction of increased capacity, it is kept in the same mode (i.e. fast or interleaved) but moved to the next lower target profile.

The second profile type, namely the capped profiles, are defined in the same way but have an upper rate which is below the maximum rate assigned to the particular DSL protocol being employed by the equipment in use which we will assume in the present example to be the first, 24 Mbits/sec, profile (e.g. assuming the equipment is operating according to the ADSL 2+ profile). In this embodiment, five different upper rates are used and can be combined with three different interleaving options (i.e. no interleaving or one of two different interleaving depths) with a fixed target SNM. Hence, fifteen capped profiles are stored as indicated below in table 3.

TABLE 3

Capped Profiles

| Rate Range (kBits/sec) | Interleave Index | Target SNM |
|---|---|---|
| 7168-14336 | 0 or 1 or 2 | 6 dB |
| 4864-9728 | 0 or 1 or 2 | 6 dB |
| 3328-6656 | 0 or 1 or 2 | 6 dB |
| 2272-4544 | 0 or 1 or 2 | 6 dB |
| 1472-3072 | 0 or 1 or 2 | 6 dB |

Fixed rate profiles are similar to the capped profiles but define much lower upper rates with very narrow range. Their use is restricted for very problematic DSLs which therefore require a very low line speed to avoid frequent re-synchronisations. Here, four different ranges are defined with two interleaving options and a single target SNM. Therefore, a total of eight fixed rate profiles are available, as indicated in table 4 below.

TABLE 4

Fixed Rate Profiles

| Rate Range (kBits/sec) | Interleave Index | Target SNM |
|---|---|---|
| 1152-2272 | 0 or 1 | 6 dB |
| 576-1152 | 0 or 1 | 6 dB |
| 288-576 | 0 or 1 | 6 dB |
| 160-288 | 0 or 1 | 6 dB |

Having defined the three different profile types, the DLM algorithm employed by the DLM function 110 of the management device 100 will be described.

As background, in order to improve quality of service provided to an end user, it would be useful to estimate the noise on a DSL (and so its SNM) in order to determine the maximum rate at which the DSL can operate without experiencing excessive errors which would require re-synchronisation. However, due to the different types of noise and their variability, this is very difficult to achieve. By monitoring the DSL's performance over a longer period, the DLM algorithm can determine that the DSL is only capable of correct operation if it operates at a rate which corresponds to a SNM sufficient to deal with the noise events over said longer period. It can deduce this by determining that the connection is stable when the variable data rate is below this threshold rate.

By using historical performance data for the DSL, therefore, the DLM algorithm can implement a profile change such that the upper rate is limited to a rate below the threshold rate. Under these conditions, the nature of the noise at the time the DSL connection was established, or even the DSLAM's ability to estimate it, is largely irrelevant and the DSLAM will always, or at least nearly always, connect at this upper rate selected by this DLM algorithm and so have increased stability.

In the context of our profile types, therefore, the algorithm can use the FRA profiles in the conventional manner until a sufficient time period has passed for meaningful performance, information to be collected and analysed. In the embodiment, stability is checked on a daily basis with the threshold rate being determined based on a longer term period, for example using data collected over the past seven days. If the line is unstable, the threshold rate is determined and a change to either capped or fixed rate profile types implemented with the selected profile having an upper rate closest to, but below, the threshold rate.

However, it is to be remembered that the purpose of the DLM algorithm to maximise the line rate for a DSL whilst maintaining stability. If the noise performance improves over time, the DSL will be set to a lower rate than it can now handle with required stability. If possible, we therefore want to improve the line rate but without risking instability. Whilst it is relatively easy to detect instability, gauging whether a stable line can support a higher rate is difficult. Here, an indicator that an increase in line rate should not be taken is found to be the variability of the SNM experienced by the noise connection. A high degree of SNM variation is indicative that an increase in line rate should not be made, particularly if the minimum SNM is small. We therefore take this into account in our DLM algorithm noting the following noise issues.

In a noise environment that exhibits relatively little variation in a short time scale, the use of FRA profiles (varying between the minimum and maximum line rates and by interleaving depth and target margin) should be sufficient to provide effective line stabilisation. This is detectable in the performance data from the DSLAM 20 by a low variation in SNM and, in this case, the DLM function 110 will continue to be valid in taking action to increase or decrease the rate in the conventional way.

In a noise environment that exhibits relatively large variations either within short to medium time scales, the use of the capped profiles (varying between defined lower and upper line rates, lower than the maximum rate for the relevant FRA profile set) is used. This is detectable by determining the threshold rate (the maximum rate at which the DSL can operate without experiencing excessive errors which would require re-synchronisation) that the line has achieved over a previous period, here seven days, and selecting a profile with an upper rate closest to, but below, the threshold rate. The variability in SNM should then be monitored and calculated for the DSL to prevent any re-profiling action that would attempt to increase the line rate due to reduction in other performance information while a large variation in SNM (e.g. of more than 6 dB variation in SNM over the 7 day period) still exists.

In a noise environment that exhibits relatively large variations in the short term, or severe impulse noise, the use of the fixed rate profiles is preferred rather than the FRA or (rate adaptive) capped profile sets. This is detectable by the failure of both FRA and capped profile sets with a low line rate and SNM. The variability of the SNM can then be calculated for the DSL on the fixed rate profiles to prevent any re-profiling action that would attempt to increase the line rate due to the reduction in other performance information while a large variation in SNM variation still exists.

Figure 3:
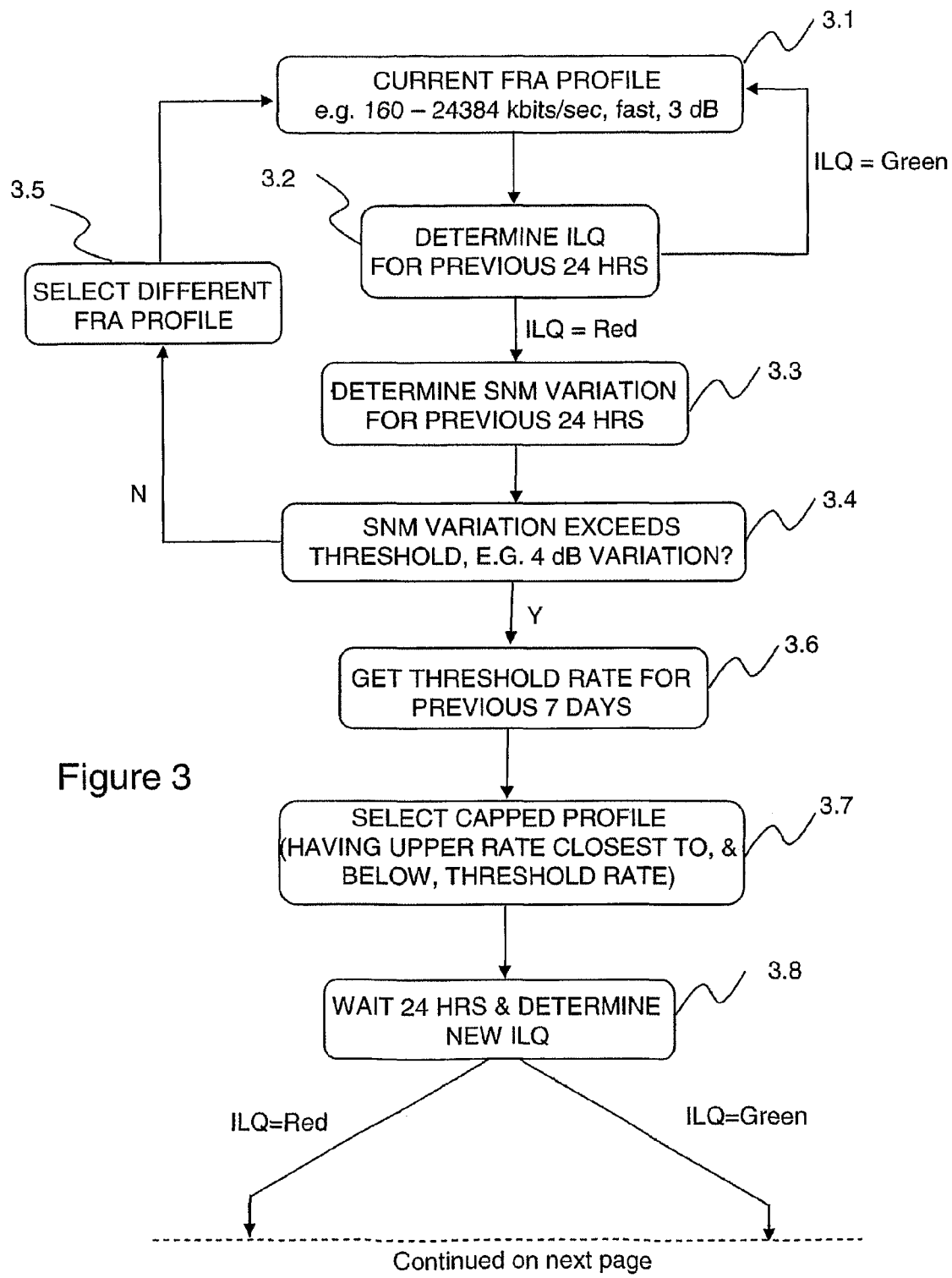
FIG. 3 is a flow diagram illustrating the steps carried out by the management device of FIG. 1 in performing the DLM algorithm.

The DLM algorithm will now be described for a given DSL in detail with reference to FIG. 3.

DLM Algorithm

In a first step 3.1, the DLM function 110 of the management device 100 sets the DSLAM 20 to operate with a default FRA profile, which we shall assume to be the 160-24384 kbits/sec profile with no interleaving (fast mode) and 3 dB target SNM. In step 3.2, the DLM function 110 receives and analyses performance data on a periodic basis, here daily, to assess whether a profile change is required, which may be a different FRA profile or a capped profile depending on the analysis. This assessment is made by obtaining a measure of the DSL's error performance, termed here as its Indicative Line Quality (ILQ). ILQ is generated using the MTBE and MTBR metrics and is categorised as either Green (acceptable) or Red (unacceptable) based on a predetermined threshold.

If the ILQ is Green, then the DSL is considered stable and the DLM function 110 keeps the current FRA profile. If the ILQ is Red, a profile change is considered necessary. In the next step 3.3, performance information indicating the SNM variation is retrieved for the previous twenty four hours. In step 3.4, it is assessed whether the SNM variation exceeds a predetermined threshold which is chosen here to be a 4 dB variation. If this is not exceeded, in step 3.5 a change in FRA profile is made by changing either or both of the interleaving index and target SNM. This step of selecting a new FRA profile is considered conventional and so a detailed description is not given here, although reference is made to table 2 above and the explanatory comments which give an explanation as to how changes are made within the FRA profile range.

If the SNM variation does exceed the predetermined threshold, a change in profile type is made from the FRA profile type to a capped profile type. To do this, in step 3.6 the algorithm uses the stored performance data to calculate a so-called 'threshold rate' for the previous seven days, the threshold rate being the highest rate at which the DSL operated with consistently acceptable stability over said past seven days. On the basis that the DLM algorithm seeks to maximise the data rate by reducing the rate until the line is stable, the threshold rate is sometimes referred to as the minimum line rate since this is, in practice, the lowest rate that the line operates at over the predetermined period. In step 3.7, the algorithm selects the capped profile having an upper (capped) rate closest to, but below, the threshold rate determined in step 3.6. So, for example, if the threshold rate was determined to be 8096 kbits/sec then the 3328-6656 kbits/sec capped profile is selected and applied with no interleaving (fast mode) and 6 dB target SNM. In this way, based on the noise performance of the DSL for the previous seven days, the DSL should remain stable provided the noise does not change significantly. The DSL is then operated within the banded rate range of the selected profile in a manner similar to that of the FRA profile in terms of changing between the non-interleaved and interleaved (low or high depth) index. Performance data continues to be received and stored from the DSLAM 20 for use in the next daily analysis stage.

Approximately twenty four hours later, in the next step 3.8, the DLM function 110 again receives and analyses performance data based on said previous twenty four hours to assess the stability of the DSL using the previously-selected capped profile. As before, the ILQ is generated and categorised as either Green or Red. If Green, then the DSL is considered stable for the previous day's data and subsequent steps are employed to determine whether or not the profile can be changed to provide increased line rate without risking instability. As indicated above, this is to ensure that the DSL is not operated at too conservative a line rate due to short to medium-term noise variations previously measured. These steps will be described later on.

If the ILQ is Red, the selected capped profile is not providing the desired stability despite the upper capped limit being enforced. In the next step 3.9, SNM variation for the previous twenty four hours is retrieved and analysed. In step 3.10, it is assessed whether the SNM variation exceeds the predetermined SNM variation threshold. If not, in step 3.11, the current capped profile is retained but the algorithm moves within the profile to increase its interleaving depth, i.e. from fast mode to interleaving index 1 then to interleaving index 2. If the profile is at its limit, we could then step down to the next profile down. If exceeded, in step 3.12, the next capped profile down the list is selected in place of the current one (see Table 3). In this case, the 1472-3072 kbits/sec profile replaces the 3328-6656 kbits/sec profile. The process then repeats as before with the ILQ being monitored on a daily basis. Noting that the 3328-6656 kbits/sec profile is the lowest available capped profile, if the next assessment indicates both instability (Red) and variation above the SNM variation threshold, a change in profile type is made in step 3.13 from capped profiles to fixed rate profiles (see Table 3) to cope with the apparently high noise environment. As before, re-assessment takes place daily so that, if the SNM variation falls below the acceptable threshold, a capped profile can be re-employed to increase the data rate.

Returning to the case where the ILQ is determined to be Green in step 3.8, in the next step 3.14, the SNM variation is determined and, in step 3.15, is compared against the variation threshold. At this stage, the algorithm may wait for period longer than twenty four hours, e.g. fourteen days, to get a longer term view of the noise performance with the current profile. If the SNM variation is above the threshold, in subsequent step 3.16 the current profile is nevertheless changed upwards, e.g. from the 3328-6656 kbits/sec profile to the 4864-9728 kbits/sec profile, to determine if a higher line rate can be sustained in view of the fact that the ILQ was green for the previous profile. The process then repeats as before in step 3.17 If the SNM variation is below the threshold in step 3.15, this indicates a high level of stability and so, in subsequent step 3.18 there is a change in profile type from the capped profile back to a FRA profile having a target SNM above, and nearest to, the maximum variation in SNM. So, if the maximum variation was measured as 4 dB, the FRA profile having a 6 dB target margin is selected. In step 3.19, the process returns back to step 3. If a maximum variation in SNM of only 2 dB is measured, then an FRA profile having a target margin of only 3 dB is selected, etc.

In summary, there has been described a management device for an access network, particularly a DSL access network, which operates under the control of a DLM algorithm. Said algorithm attempts to maintaining stable connections in different noise environments whilst maximising the data rate. This is achieved by employing a plurality of different profiles divided into different profile types. Decisions as to which profile type and profiles to use is based on connection performance and the variation of SNM monitored over a predetermined medium term period.

The invention claimed is:

1. A method of operating an access network including a plurality of data connections between end user devices and an aggregation transceiver device where the connections are aggregated for onward connection through the access network, the method comprising:

storing a plurality of different profiles including one or more fully rate adaptive profiles and one or more rate capped profiles, each of which specifies a set of values for a plurality of parameters associated with each data connection; and, for each data connection, monitoring the performance of the connection;

selecting one of said stored profiles to be applied to the connection in dependence on the results of monitoring the connection; and applying the selected profile to the data connection;

wherein monitoring the connection includes measuring the variation in Signal to Noise ratio of received signals over a predetermined period of time and selecting a rate capped profile in the event that the variation exceeds a predetermined amount of variation, wherein each applied profile has a rate variable within a predetermined range.

2. A non-transitory computer readable storage medium tangibly carrying a computer program or suite of computer programs for causing the method of claim 1 to be carried out during execution of the program or programs.

3. A method of operating an access network including a plurality of data connections between the access network and end user devices, wherein the access network controls the rate at which data is transferred between the user devices and an onward connection, wherein the method comprises, for a given data connection:
   (a) enabling data transfer at different data rates up to a maximum rate;
   (b) determining connection performance for the different data rates based on errors which occur for the different data rates;
   (c) measuring the variation in signal to noise margin and, in the event that the variation exceeds a predetermined level, limiting the rate at which the connection can operate to one which is no greater than an upper rate which is below the maximum rate, said upper rate being selected in accordance with the data rates at which the connection was operated in (a) with a connection performance determined to be within acceptable limits.

4. A method according to claim 3, wherein (c) is performed in response to a determination that the connection performance is outside acceptable limits in (b).

5. A method according to claim 3, wherein the upper rate is selected in accordance with the highest data rate at which the connection was operated in (a) with a connection performance determined to be within acceptable limits for a predetermined period.

6. A method according to claim 5, wherein the upper rate is selected from a plurality of predefined profiles each of which specifies a different upper rate to be applied to the connection, the selected profile being the one having the closest upper rate to said minimum data rate.

7. A method according to claim 6, wherein if the connection performance with the selected profile is outside acceptable limits for a predetermined period, the profile having the next lowest upper rate is applied.

8. A method according to claim 7, wherein the different profile is selected and applied only if, in addition to the connection profile being outside acceptable limits, the variation in signal to noise margin is above a predetermined level.

9. A method according to claim 6, wherein if the connection performance with the selected profile is within acceptable limits for a predetermined period, the upper data rate at which the connection can operate is increased, the upper data rate being dependent on the variation in signal to noise margin.

10. A method according to claim 9, wherein if the variation in signal to noise margin exceeds a predetermined level, a different one of the profiles having the next highest upper data rate is applied.

11. A method according to claim 9, wherein if the variation in signal to noise margin does not exceed a predetermined level, the upper data rate is the maximum data rate for the connection.

12. A method of operating an access network including a plurality of data connections between the access network and end user devices, wherein the access network controls the rate at which data is transferred between the user devices and an onward connection, wherein the method comprises, for a given data connection:
   (a) enabling data transfer at a variable data rate between predetermined upper and lower limits; and
   (b) determining whether at least the predetermined upper limit can be changed after a predetermined period in dependence on whether the variation in signal and noise margin exceeded a predetermined threshold during said period.

13. A method of operating an access network including a plurality of data connections between the access network and end user devices, wherein the access network controls the rate at which data is transferred between the user devices and an onward connection, the access network storing a plurality of capped profiles each of which specifies a respective upper data rate to which the connection can be limited, each upper data rate being below the maximum achievable rate for the connection, wherein the method comprises, for a given data connection:
   enabling data transfer at a variable data rate up to the maximum rate;
   monitoring the error performance and signal to noise margin variation for different data rates and, in the event that both are outside respective limits for a predetermined period, selecting and applying one of the capped profiles to limit the upper data rate, selection being determined by the highest data rate achieved for which the error performance was within acceptable limits.

14. A management device for use in an access network including a plurality of data connections between the access network and end user devices, wherein the access network is arranged to control the rate at which data is transferred between the user devices and an onward connection, the management device comprising:
   a processor;
   a store storing a plurality of profiles each of which specifies a line speed range such that when it is applied to a data connection, the connection is controlled to transfer data at different data rates no greater than a maximum rate;
   wherein the management device is configured to use the processor to determine connection performance for each connection at different data rates based at least partially on errors which occur for the different data rates; and
   wherein the management device is further configured to use the processor to measure the variation in signal to noise margin and, in the event that the variation exceeds a predetermined level, to limit the rate at which the connection can operate to one which is no greater than an upper rate which is below the maximum rate, said upper rate being selected in dependence on the data rates at which the connection was operated previously with a connection performance determined to be within acceptable limits.

15. An access network including a management device according to claim 14.

* * * * *